April 17, 1956  J. W. FOGWELL  2,742,160

FILTER CARTRIDGE

Filed June 14, 1951

INVENTOR.
JOSEPH W. FOGWELL
BY
Woodling and Krost
atty.

United States Patent Office 2,742,160
Patented Apr. 17, 1956

2,742,160

FILTER CARTRIDGE

Joseph W. Fogwell, Lakewood, Ohio

Application June 14, 1951, Serial No. 231,505

6 Claims. (Cl. 210—169)

This invention relates in general to filters and more particularly to thick-walled cylindrical filter cartridges for use in a filtering container.

An object of the invention is the provision of a filter cartridge which will permit the liquid, which is to be filtered, to pass from the outer cylindrical region to the inner cylindrical region, such that the larger particles are filtered out or collected in the outer cylindrical region of the cartridge, and such that the smaller particles may pass radially through the wall of the cartridge towards the inner cylindrical region where they are filtered out or collected, the smallest of the particles being substantially all collected or filtered out at the very inner cylindrical region of the cartridge.

Another object of the invention is the provision of and the process for making a thick-walled cylindrical filter cartridge having a filter medium assembled with varying compactness, both in a spiral direction and in a radial direction.

Another object of the invention is the provision of and the process for making a thick-walled cylindrical filter cartridge having a filter medium assembled with varying compactness, both in a spiral direction and in a radial direction, the compactness decreasing uniformly in an outward spiral direction from one point on the spiral to a second point on the spiral and decreasing abruptly in an outward radial direction from one convolution to the next.

Another object of the invention is the provision of and the process for making a thick-walled cylindrical filter cartridge having a filtering medium assembled to produce abrupt changes in compactness in a radial direction and to produce gradual changes in compactness in a spiral direction.

Other objects and a fuller understanding of the invention may be had by referring to the following description and claims taken in conjunction with the accompanying drawing, in which:

Figure 1:
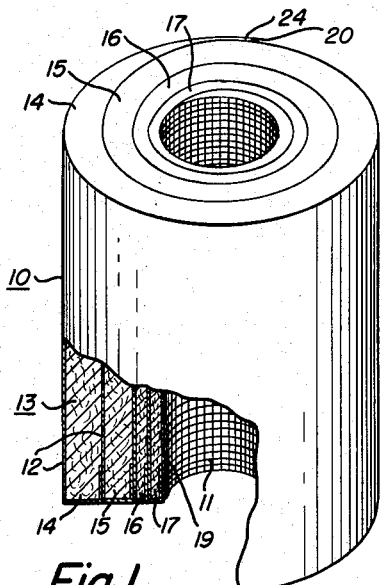
Figure 1 is a perspective view of a thick-walled cylindrical filter cartridge embodying the features of the invention, parts being broken away to illustrate the internal construction thereof.

With reference to Figure 1 of the drawing, the thick-walled cylindrical filter cartridge is indicated by the reference character 10, and comprises generally a tubular core 11, a backing strip 12, and a filtering medium 13. As illustrated, the backing strip 12 and the filtering medium 13 are spirally wrapped around the tubular core 11. In the drawing, four spiral convolutions are illustrated by the reference characters 14, 15, 16 and 17, but it is to be understood that any number of spiral convolutions may be employed for making the thick-walled cylindrical filter cartridge.

Figure 2:
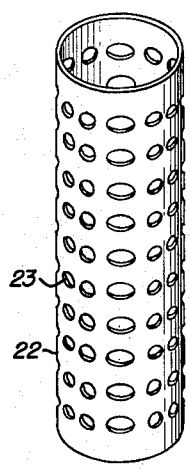
Figure 2 is a perspective view of a modified tubular core having perforations therein which may be employed instead of the screen tubular core shown in Figure 1.

The tubular core as shown in Figure 1 is preferably constructed of screen material having a multitude of small radial openings which will permit the filtered liquid to flow radially therethrough. In Figure 2, a modified form of the tubular core is shown and is illustrated by the reference character 22 which has a plurality of radial openings 23 therein, producing a perforated core through which the filtered liquid may radially flow. In Figure 1, the wall of the screen is illustrated by the reference character 19. The filtering material 13 is assembled with varying compactness, both in a spiral direction and in a radial direction, the compactness decreasing uniformly in an outward spiral direction from one point on the spiral to a second point on the spiral and decreasing abruptly in an outward radial direction from one convolution to the next. The outside end 20 of the backing strip 12 is provided with an adhesive or bonding material 24, see Figure 7, so that the convolutions are secured against unwinding. The bonding material 24 bonds the outside end 20 of the last convolution to the outside of the next adjacent convolution. While a bonding material has been employed to secure the convolutions against unwinding, it is to be understood that other means may be employed such as sewing.

Figure 4:
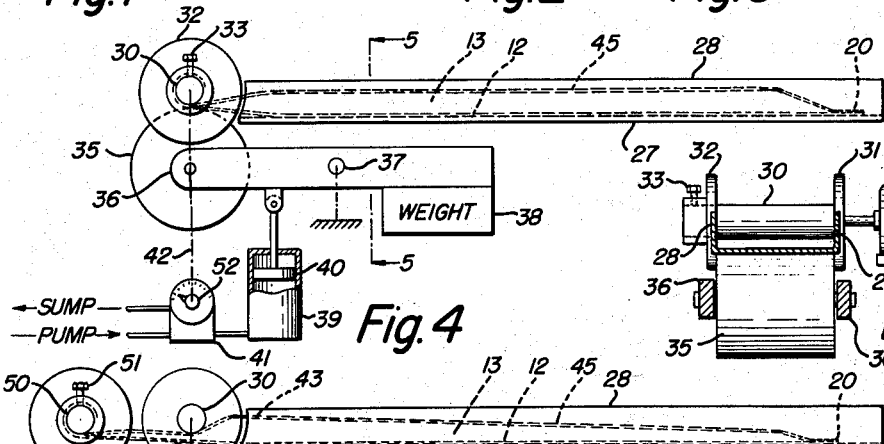
Figure 4 is a side view of an apparatus for carrying out the process for making a thick-walled cylindrical filter cartridge embodying the invention.
Figure 5:
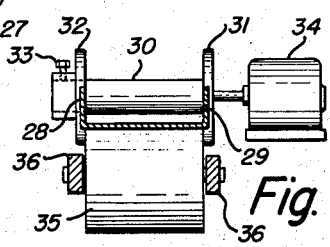
Figure 5 is a cross-sectional view taken along the line 5—5 of Figure 4.

In Figures 4 and 5, an apparatus is illustrated for carrying out the process of constructing the thick-walled cylindrical filter cartridge. As illustrated, the apparatus comprises principally a flat table 27 having upwardly extending sides 28 and 29. The backing strip 12 is first placed on the table, after which the filtering medium 13 is placed thereon, see the diagrammatic and perspective view in Figure 7. The filtering medium 13 is distributed with substantially a uniform depth and is spread longitudinally of the central region of the backing strip, with marginal edges 45 of the backing strip extending laterally therefrom. After the filtering medium is placed thereon the longitudinal marginal edges 45 of the backing strip are folded over the edges of the filtering medium and advanced end of the backing strip is adapted to be wound around a mandrel 30 which is driven by a motor 34.

The mandrel 30 has a fixed side flange 31 and a removable side flange 32 which is mounted upon the mandrel by means of a set screw 33. The object of the removable side flange 32 is to enable the filter cartridge to be removed after it is once formed. As the backing strip 12 and the filter medium 13 are spirally wrapped around the mandrel, they are pressed by means of a press roll 35 which is carried by two side lever arms 36 pivotally mounted upon a pivot 37. As shown in Figure 4, the right hand end of the lever arms 36 are provided with a weight 38 so that the press roll 35 is urged against the mandrel 30. During the process of spirally winding the backing strip 12 and the filtering medium 13 around the mandrel 30, the press roll 35 is urged toward the mandrel by means of a hydraulic piston 40 operated within a hydraulic cylinder 39. The pressure of the hydraulic fluid is governed by means of a regulator pressure valve indicated generally by the reference character 41. The function of the regulated pressure valve 41 is to control the pressure within the cylinder 39 in accordance with the rotation of the press roll 35. As illustrated, the regulated pressure valve 41 may be mechanically connected by any suitable means to the mandrel 30, the mechanical means being illustrated diagrammatically by the dash-dot line 42. During the first convolution which is indicated by the reference character 17, the hydraulic pressure of the fluid within the cylinder 39 is of a high value thereby compacting the filtering medium with high pressure. As the regulating pressure valve 41 is turned by the mechanical means illustrated by the dot-dash line, the pressure within the cylinder gradually decreases uniformly as the filtering medium is spirally wound around the mandrel. The resultant effect of the varying pressure is such that the radial depth of the inner convlution 17 is less than the convolution 16, and the convolution 16 is less than the convolution 15, and the convolution 15 is less than the outer convolution 14. Accordingly the compactness of the filtering medium decreases uniformly in an outward spiral direction from one convolution to the next or from one point on a convolution to a second point on a convolution.

Figure 3:
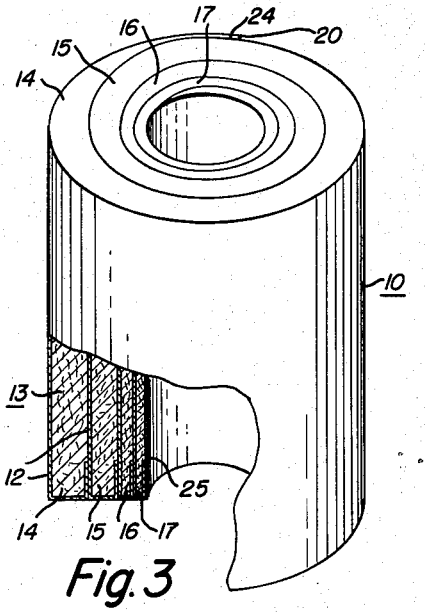
Figure 3 is a view similar to Figure 1 and shows the assembly without any reinforced tubular core.
Figure 7:
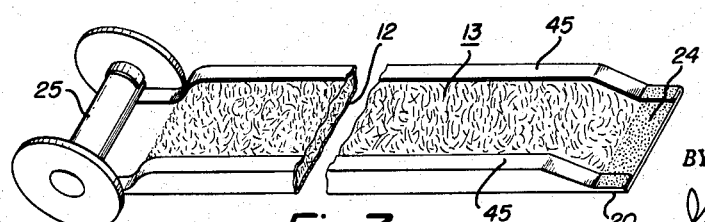
Figure 7 is a perspective view of the backing strip and the filtering medium provided thereon, preparatory to being spirally wound around a mandrel.

In Figure 3, the tubular core is constructed of the backing strip 12 and this construction is effected by making at least one complete convolution of the backing strip 12 before the filter medium reaches the mandrel. The wall of the tubular core in Figure 3 is indicated by the reference character 25. In Figure 7, the advanced end of the backing strip 12 is indicated by the reference character 25 and this constitutes the beginning of the wrapping of the backing strip into the first convolution to make the wall 25 of the core of the same material as the backing strip.

In constructing the filter cartridge shown in Figure 1, the screen tubular core 11 is first mounted around the mandrel 30 before the spiral wrapping process is initiated. Similarly, in producing a filter cartridge with a perforated core as shown in Figure 2, the perforated core is first inserted over the mandrel 30 before starting the wrapping process.

Figure 6:
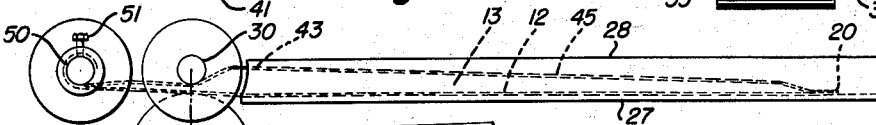
Figure 6 is a modified form of the apparatus shown in Figure 4.
Figure 8:
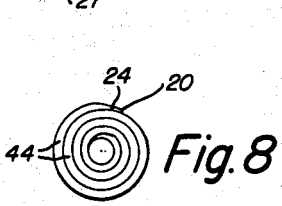
Figure 8 is a plan view of a modified form of the cartridge shown in Figure 1.

In Figure 6, there is shown a modified arrangement of the wrapping apparatus in that an additional mandrel 50 is employed which becomes the final wrapping mandrel with the result that the mandrel 30 and the press roll 35 become merely pressing rolls to control the thickness of the filtering medium 13. The mandrel 50 is motor driven and has a side flange which may be removed by means of a set screw 51. In Figure 6, the filtering medium is disposed upon the backing strip such that the filtering medium at the advanced end 43 of the backing strip is deeper or thicker than the filtering medium at the rearward end of the backing strip. In Figure 4, the depth of the filtering medium is distributed at substantially a uniform depth and the pressure of the press roll 35 is varied to control the degree of compactness. In Figure 6, the press roll 35 is hydraulically positioned at a fixed point by the piston 40 being hydraulically locked in place within the cylinder 39 by entrapping fluid therein by the pressure valve 41, with the result that the rolled thickness of the filtering medium 13 is substantially uniform, as shown by the convolutions 44 in Figure 8 which represents the top view of a filter cartridge made by this method. In other words, the spacing between the press roll 35 and the mandrel 30 is maintained substantially constant during the spiraling operation, inasmuch as the filtering material 13 at the advance end of the backing strip 12 is piled deeper than at the rearward end, the compactness of the filtering medium for the inner convolutions is greater than that for the outer convolutions. The Figure 6 thus represents a modified process for obtaining a varying compactness.

In the operation of the apparatus in Figure 6, the regulated pressure valve 41 is de-clutched from the mandrel 30 by pulling out on a knob 52 which knob sets the pressure of the fluid within the hydraulic cylinder 39. Other elements may be employed to vary the degree of compactness but the arrangements shown in Figures 4 and 6 are particularly adaptable for carrying out the process in making the filter cartridge.

The backing strip 12 may be constructed of cloth, wire screen, filter paper or any other porous strip. The filtering medium 13 may be selected from a filter class consisting of diatomaceous earth, vermiculite, kieselguhr and fuller's earth, cotton waste, woolen waste, synthetic fiber waste, wood pulp, straw fibers, foam rubber, foam plastic, and foam material, or a combination of one or more of the above listed filter mediums. The filtering medium 13 may be bulk or loose material, or may be pre-formed by suitable felting means or by pre-molding.

A cylindrical cartridge constructed in accordance with the present invention provides a medium through which the liquid to be filtered may flow from the outside thereof towards the inner core thereof. As the filtered liquid flows from the outside to the inside thereof, the large particles are first filtered out by the outer convolutions. As the liquid passes radially inwardly towards the central core, it encounters abrupt changes in compactness as it passes from each convolution to the next. These abrupt changes provide an opportunity for the filtered liquid to then spread spirally which operates to distribute the particles that are to be filtered out. The action of the filter is such that substantially all the finest particles are filtered out by the inner convolution. Accordingly, the filter cartridge may become highly saturated or loaded with well distributed filtered particles in a radial direction, thus rendering the filtered cartridge highly efficient. If the small particles were permitted to be filtered out near the outer convolution, then these small particles would clog up the filter cartridge and would prevent the inner convolutions of having the opportunity to become useful. Therefore, in the present invention, the fact that the compactness decreases uniformly in an outward spiral direction from one point on the spiral to a second point on the spiral while decreasing abruptly in an outward radial direction from one convolution to the other, is an important feature of the invention.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A filter cartridge comprising a previous central core, a layer of filtering material spirally wound about said core and formed throughout its length in increments of progressively and gradually decreasing thickness from the core outwardly, each successive convolution having a body compactness and density differing substantially from that of the adjacent convolution, a backing strip for said layer, and means for securing said convolutions in their spiral form.

2. A filter cartridge according to claim 1, in which the compactness and density of the filter layer decreases uniformly in a spiral direction from one convolution to the next, and decreases abruptly in a radial direction from one convolution to the next.

3. A filter cartridge according to claim 1, in which the compactness and density of the filter layer increases uniformly in a spiral direction from one convolution to the next, and increases abruptly in a radial direction from one convolution to the next.

4. A filter cartridge according to claim 1, in which the layer of filter material has gradual changes in compactness, thickness and density in a spiral direction, said changes being abrupt in a radial direction, in each layer.

5. A filter cartridge according to claim 1, in which the backing strip also constitutes the core.

6. A filter cartridge according to claim 1, in which the backing strip has marginal edges folded over the side edges of the filter layer.

References Cited in the file of this patent

UNITED STATES PATENTS

| | | |
|---|---|---|
| 2,141,144 | Warner | Dec. 20, 1938 |
| 2,141,903 | Brundage | Dec. 27, 1938 |
| 2,349,174 | Klinkhamer | May 16, 1944 |
| 2,349,469 | Sloan | May 23, 1944 |
| 2,386,684 | Hermanson | Oct. 9, 1945 |
| 2,427,733 | McCann | Sept. 23, 1947 |
| 2,463,929 | West | Mar. 8, 1949 |
| 2,486,217 | Slack et al. | Oct. 25, 1949 |
| 2,512,797 | Harvout | June 27, 1950 |
| 2,537,897 | Hunter | Jan. 9, 1951 |
| 2,546,230 | Modigliani | Mar. 27, 1951 |
| 2,665,075 | Baldwin | Jan. 5, 1954 |